UNITED STATES PATENT OFFICE.

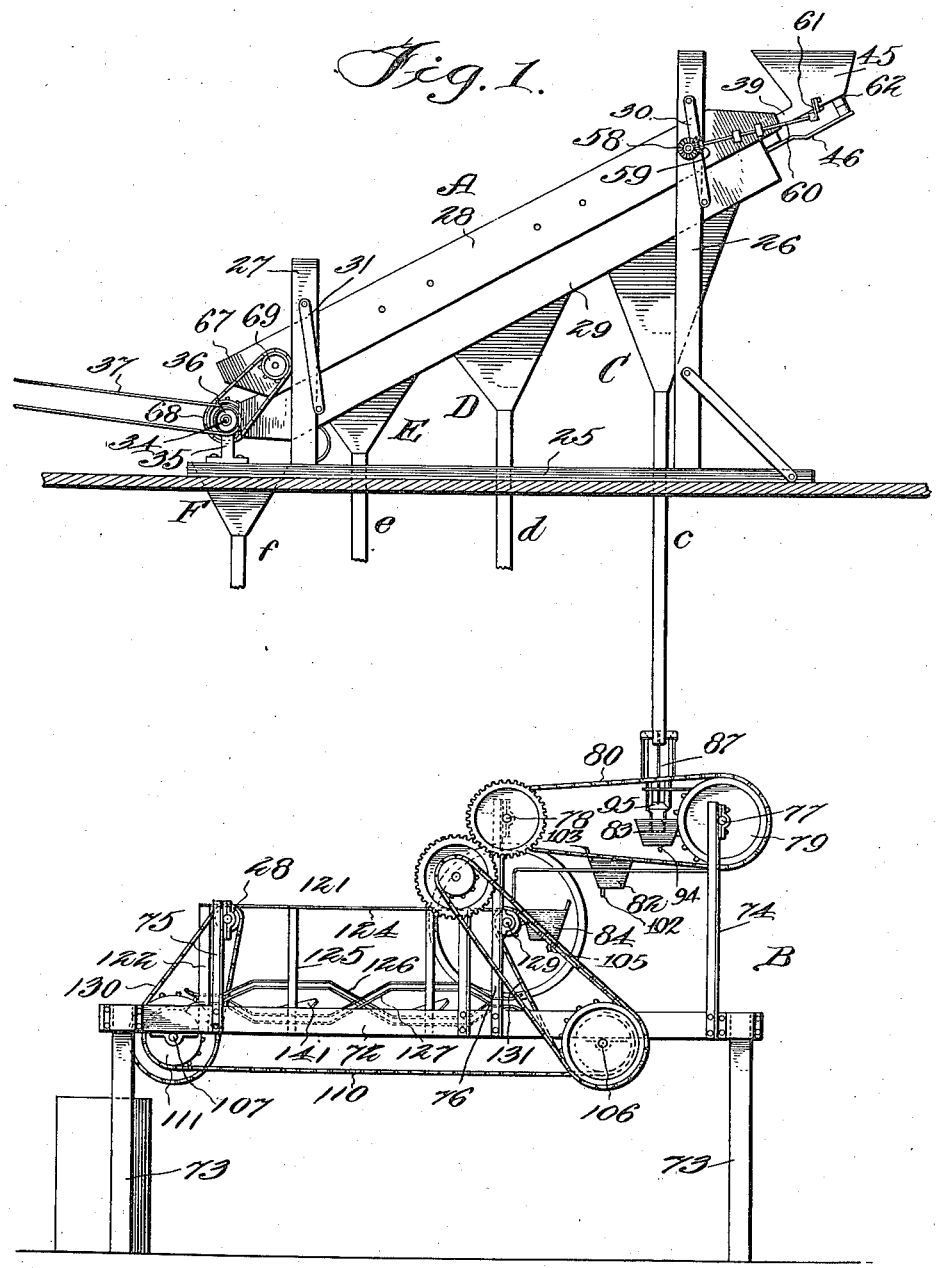

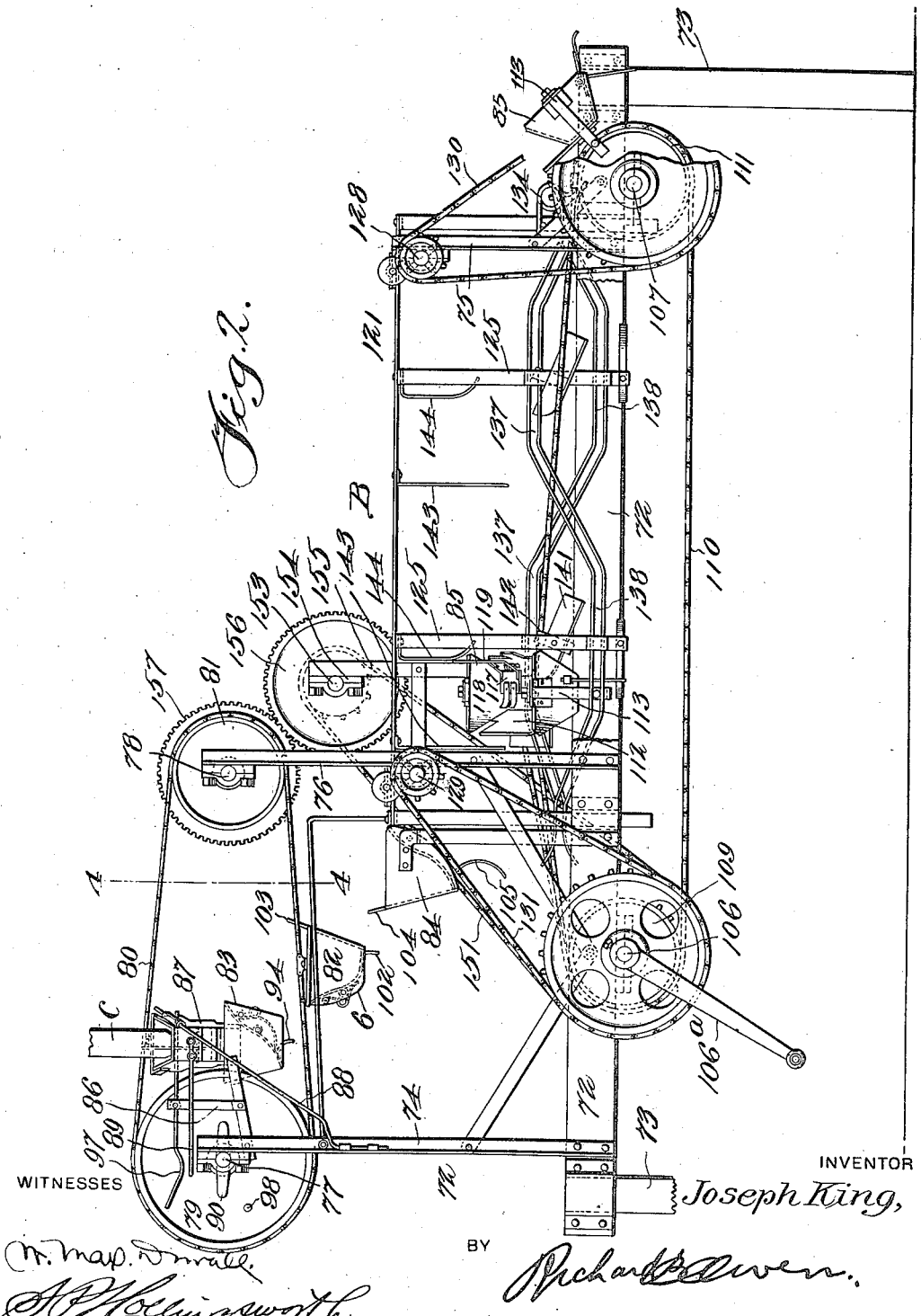

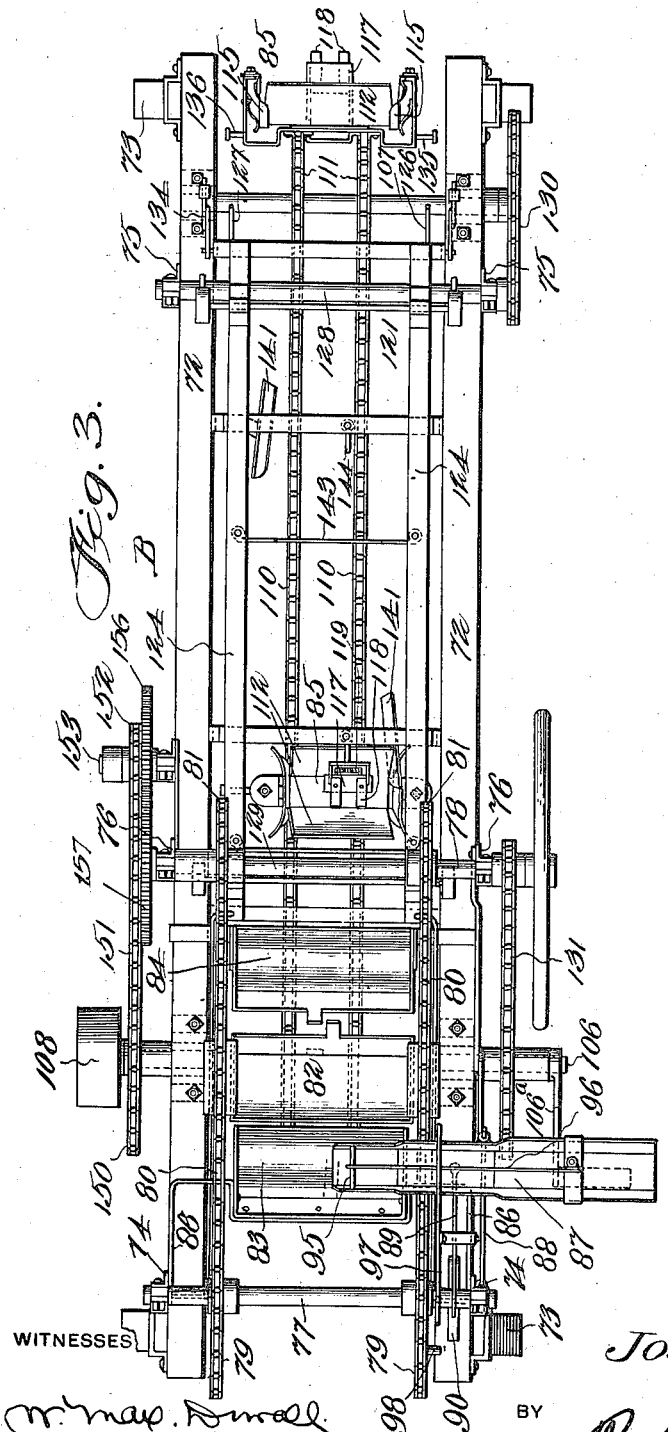

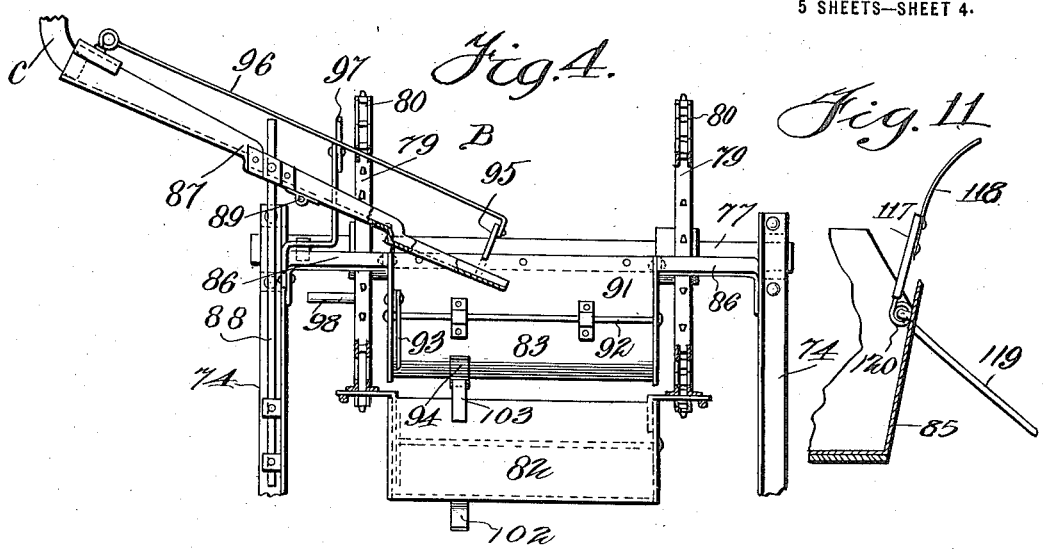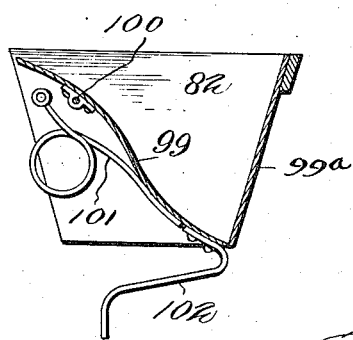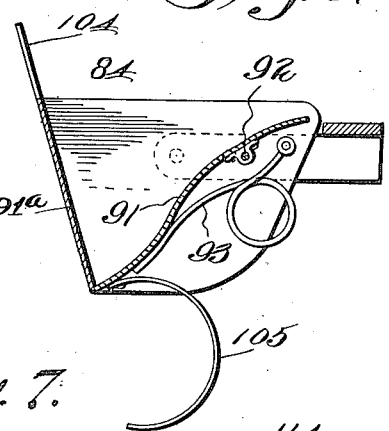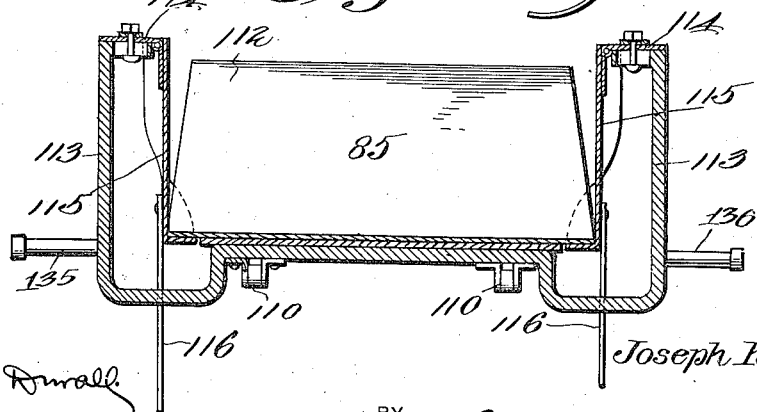

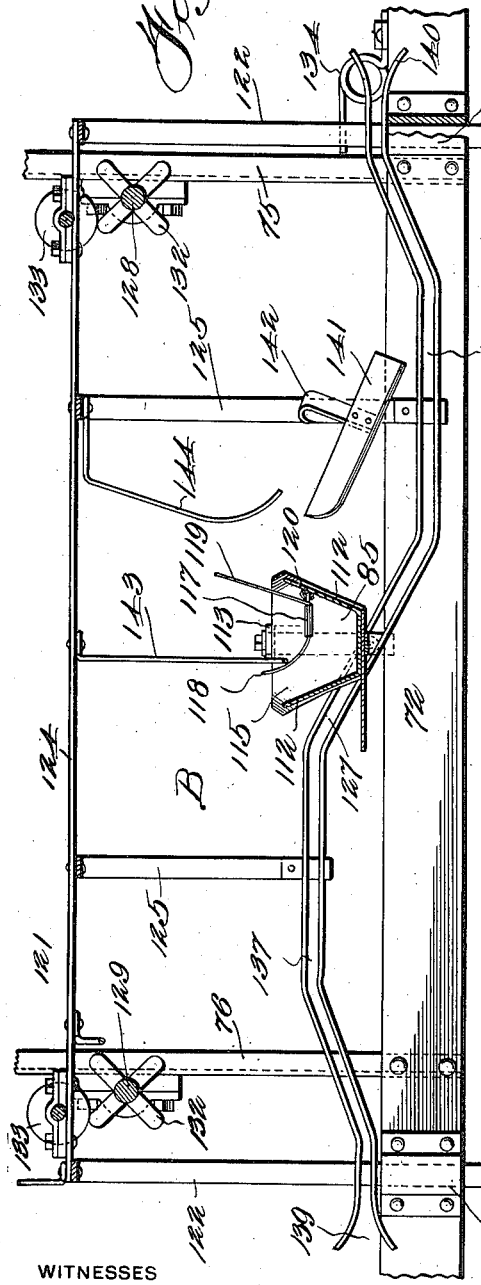
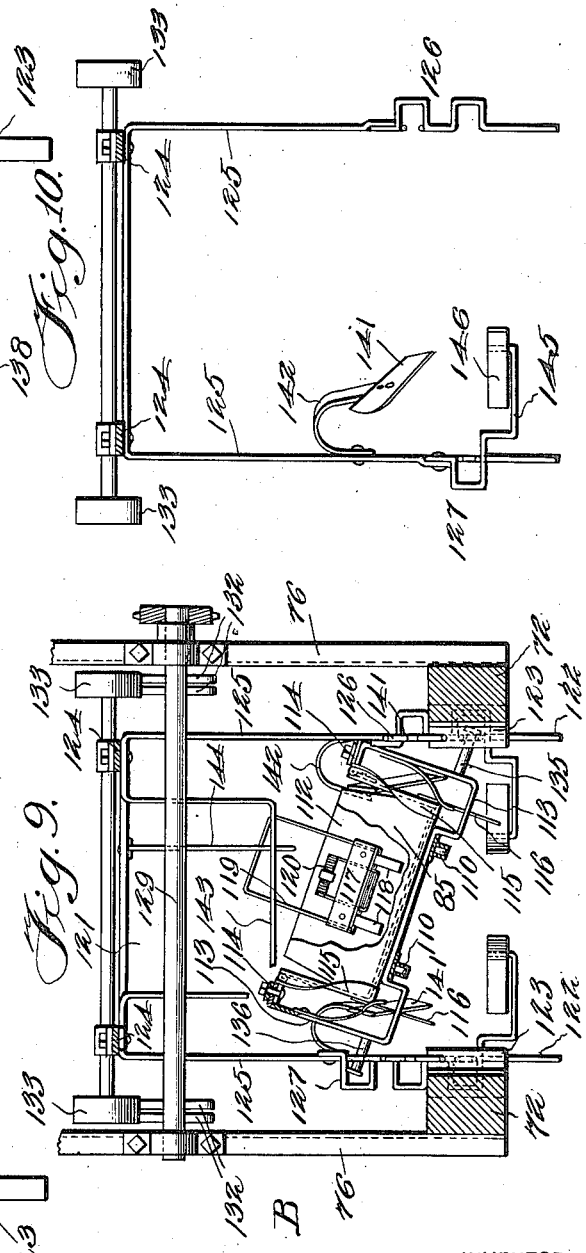

JOSEPH KING, OF MEXICO, NEW YORK, ASSIGNOR OF ONE-FOURTH TO GEORGE M. WHITNEY AND ONE-FOURTH TO WILL H. BAUDER, OF NEW HAVEN, NEW YORK.

BEAN-SNIPPING MACHINE.

1,253,254.  Specification of Letters Patent.  Patented Jan. 15, 1918.

Application filed March 25, 1916. Serial No. 86,657.

*To all whom it may concern:*

Be it known that I, JOSEPH KING, a citizen of the United States, residing at Mexico, in the county of Oswego and State of New York, have invented certain new and useful Improvements in Bean-Snipping Machines, of which the following is a specification.

This invention relates to a system and apparatus for automatically cutting off or snipping the ends of vegetables, particularly string-beans and the like, preparatory to canning them, and comprises generally a mechanism including a receiving hopper into which beans are delivered in bulk and from which they pass into carriers or traveling hoppers in measured quantity, and wherein said beans are caused to lie substantially parallel while moving toward knives for the purpose of cutting off first one end and then the other end of the entire quantity of material in the hopper. Following this operation, the beans are dumped from the carriers into suitable receptacles or chutes or upon conveyers to be removed for future treatment.

An object of the invention is directed to means for delivering measured quantities of beans into carriers or traveling hoppers in which the beans are conducted to the snipping knives, said carriers having automatic devices for dumping the waste therefrom at the proper time.

Another object has reference to novel means for tilting in succession opposite ends of each carrier or hopper, while moving, so as to cause the beans to gravitate toward the lower end and aline like ends of the beans in position to be snipped or cut off; to hold the alined beans in position while being snipped; to open the ends of the carriers for the escape of the waste; to impart a constant shaking movement to the carriers while in operation, their tilting means and the cutting knives, and to other details of construction which will be fully set forth in the following specification, pointed out in the appended claims and illustrated in the accompanying drawings, in which—

Figure 1 is an elevation of a complete system for treating string beans preparatory to canning, showing however but one of the snipping machines, the others being duplicates and therefore unnecessary to illustrate, Fig. 2 is a side elevation of the snipping mechanism complete, Fig. 3 is a plan view of the same, Fig. 4 is a vertical sectional view on the line 4—4 of Fig. 2 looking in the direction of the feed chute, Figs. 5 and 6 are enlarged cross-sectional views of two types of distributers by means of which the beans are measured and conveyed to the traveling carriers, Fig. 7 is a vertical longitudinal sectional view of one of the traveling carriers or hoppers, Fig. 8 is a vertical longitudinal sectional view through one end of the snipping machine, illustrating means for tilting and shaking the traveling carriers, Fig. 9 is an end view looking in the direction of movement of the carriers, the main frame being shown in section, Fig. 10 is an elevation of one of the individual carrying frames and parts appertaining thereto, and Fig. 11 is a detail cross sectional view of one of the traveling carriers showing the holding fingers in elevated position.

Similar reference characters are used to indicate the same parts in all the figures. In Fig. 1 of the drawings is illustrated a complete system of grading and snipping beans comprising a grading mechanism A and a plurality of cutting or snipping machines placed below the grading mechanism preferably on the floor below, the number of such machines depending on the number of sizes into which the material is divided. In the present instance there are four grades, but as the snipping machines are the same for all grades, but one only is shown at B.

The different sizes of beans are delivered to one or more hoppers as C, D, E and F and can be conveyed by chutes $c$, $d$, $e$, and $f$ each to the feed hopper of its respective snipping machine. Each of these machines comprises a strong frame 72 supported from the floor on legs 73. Included as a part of the framework are two vertical columns 74 at the feed end of the machine, similar members 75 at the delivery end and two columns 76 of the same height as the column 74 intermediate the opposite ends of the machine. At the top of the columns 74 is a cross-shaft 77, and a like shaft 78 is journaled at the top of the columns 76. A pair of sprocket wheels 79 on the shaft 77 are driven by sprocket chains 80 to which motion is imparted from the sprocket wheels 81 on the shaft 78. Hanging from the chains 80 are a plurality of distributer buckets 82 each of which receives a measured quantity of material from a fixed hopper 83 and carries it a short distance to a second fixed hopper 84 that retains the material until ready to be dumped into one of the carriers or traveling buckets 85 where the material is held while its ends are being snipped or cut-off. The hopper 83 is secured in place near the top of the columns 74 by a bracket frame 86 above which hopper is an inclined trough 87 into the upper end of which the chute as it comes from the grading machine pours the product therefrom. The trough 87 is supported from the column 74 by a resilient arm 88 extending at an angle to said column and adapted to be shaken or vibrated by means of an arm 89 extending from the bottom of the trough 87 above the shaft 77 in position to be struck by tappets 90 upon the said shaft 77. By thus vibrating the trough 87, the beans that are deposited thereon are maintained in proper alinement for entering the hopper 83 and straightening such beans as temporarily get out of alinement.

The fixed hoppers 83 and 84 are substantially the same and a description of one will serve for both. The hopper 83 is open at its top and is provided with a straight fixed side 91$^a$ and combined rocking or swinging side and bottom 91 having a compound curve shape in section, pivoted on the shaft 92, the ends of which are fixed in the ends of the hoppers. The bottom 91 is maintained in closed position against the fixed side by a spring 93 of any approved form. Projecting downwardly from the lower edge of the rocking bottom 91 of the hopper 83 is a finger 94 which at the proper time is struck by the traveling distributer 82 and the bottom of said hopper opened so that its contents will fall into the distributer. During the time the bottom 91 remains open, means are provided to prevent the beans in the trough 87 from feeding into the hopper 83. These means comprise a gate 95 mounted on one end of a spring arm 96, the opposite end of which is formed into a coil and secured to the trough near its upper end. The arm 96 is depressed at suitable times by a lever 97 pivoted to the bracket frame 86, said lever being engaged by a pin 98 on one of the sprocket wheels 79. Under normal conditions the gate 95 is elevated and held up by the spring arm on which it is mounted, and only at such times when the bottom of the hopper 83 is opened is the gate lowered to cut off the flow of material along the trough 87.

The distributing buckets 82 are each provided with one fixed side 99$^a$ and a combined rocking or swinging bottom and opposite side 99 similar in shape, mounting, and operation to the bottoms 91 within the hoppers 83 and 84. These bottoms 99 are mounted near their upper edges to rock on shafts 100, the ends of which shafts are supported by the ends of the buckets. The bottoms are maintained in closed position by springs 101. A finger 102 depending from the lower edge of the bottom 99 is provided for opening the bottom at the proper time to discharge the contents of the distributer. The distributer 82 and the hoppers 83 and 84 are somewhat similar in shape, being wider at the top than at the bottom and having one flat inclined side opposite which the respective bottoms 91 and 99 are placed, said bottoms being slightly curved and inclined, so as to form in cross section a receptacle of triangular shape whereby the beans as they enter will tend to gather and remain in alinement. Projecting upwardly from the straight side of the distributer 82 is a finger 103 of such length that as it passes beneath the hopper 83, said finger will contact with the finger 94 depending from the bottom 91 and open said bottom, so that the contents of the hopper 83 will drop into the distributer 82 and from thence be transported to the hopper 84 and when above it, the finger 102 on the door 99 of the distributer, strikes a projection 104 on the hopper 94 and rocks said door 99 into open position, whereupon, the contents of the distributer 82 is deposited in the hopper 84. On the lower end of the bottom 91 of the hopper 84 is a curved finger 105 by means of which said bottom is opened to empty the contents of the hopper.

Journaled in suitable bearings carried by the frame 72 are two shafts 106 and 107 extending across said frame near each end. The shaft 106 is the driving shaft and may be provided with a crank 106$^a$ for turning the same manually or with a pulley 108 to which power may be applied. Fixed to the shaft 106 are two sprocket wheels 109 around which pass two chains 110 that also embrace two sprocket wheels 111 on the shaft 107. Mounted on these chains at equal distances apart throughout their length are a number of traveling carriers or buckets 85 into which the beans are finally deposited and where their ends are snipped or cut off. These buckets 85 are formed with a closed bottom and upwardly and outwardly closed sides 112. Fixed to the bottom of the bucket at each end is a vertically projecting bracket 113 that extends a short distance above the top of the bucket and has bolted to its upper end one leaf of a hinge member 114, the other leaf being secured to the end 115 of the bucket, thus enabling said ends to swing outwardly and away from the body of the bucket or carrier when desired. The lower edges of the bucket ends 115 are preferably turned at right angles, so as to pass beneath the bottom of the bucket at each end. An arm 116 projects downwardly from the bottom of each bucket end 115 for a purpose to be described later. Pivoted on the front side 112 of each bucket or carrier 85 within the same is a short plate 117 from which project two or more fingers 118, their free ends curving upwardly.

Also attached to the plate 117 on the front edge thereof near the front side 112 is a U-shaped frame 119 by means of which the plate 117 and fingers 118 are depressed and caused to bear upon and hold against movement, the contents of the bucket or carrier 85. When the bucket 85 is emptied, the plate 117 is held substantially in line with the front side of said bucket at its upper edge as shown in Fig. 11 in which position the fingers 118 are turned away from the bucket and the U-shaped frame inclined in a downward direction. These parts are maintained in elevated position by means of a spring 120, preferably a coil spring, one end of which bears upon the plate 117 and the other against a side of the bucket. At the proper time, the fingers 118 are swung within the bucket by means yet to be described and held by said means upon the contents of said bucket.

Above the side bar of the frame 72 and between the shafts 106 and 107 is an upright vibratory frame 121 that is formed of a U-shaped frame 122 at each end, the downwardly projecting legs of which are carried by and slidable in sockets 123 bolted to the frame 72. The top is connected by longitudinal bars 124 from which on each side at suitable intervals depend suspending straps or links 125 that carry two longitudinal cam tracks or guide ways 126 and 127, said tracks or guide-ways being on opposite sides of the machine and are designed to tilt the carriers or buckets 85 so that the beans therein will gravitate first to one side and then to the other and thus insure the certainty of cutting the ends from all the beans.

Across the machine near the top of the vibrating frame 121 are two shafts 128 and 129 journaled in bearings on the respective columns 75 and 76. These shafts are rotated by belts 130 and 131 from pulleys or wheels on the shafts 107 and 106. The shafts 128 and 129 are each provided near each end with a plurality of radially projecting fingers 132, that, as the shafts rotate, will successively and momentarily engage the vibratory frame 121 or friction wheels 133 thereon, and, after lifting said frame a short distance, releases it and permits it to be quickly returned to its normal position by gravity and springs 134, the result being a quick vibratory movement in a vertical direction of the frame 121, the tracks 126 and 127, the carriers or buckets 85 moving along said tracks and other adjuncts which assist in the operation of snipping the ends of the beans. Projecting from the ends of each of the buckets 85, or more correctly speaking, from the upright brackets 113 attached to each bucket, are studs or pins at 135 and 136, the former traveling along the track or guideway 126 and the latter in the guideway 127. As shown particularly in Fig. 2, each track or guide-way 126 and 127 has an elevated portion 137 and a depressed portion 138, the arrangement being such that the depressed portion of one track will be opposite the elevated portion of the other, so that, the carriers traveling along the said tracks will have one side lowered and the other side raised. The two tracks come into line at their ends and have an enlarged entrance 139 in horizontal transverse position. A similar exit 140 is made at the opposite ends of the tracks. Carriers therefore entering the tracks or guide-ways in horizontal position are first tilted in one direction as they move forwardly, then straightened and tilted in the opposite direction and finally straightened once more and passed beyond the guide-ways.

Adjacent the depressed portion 138 of each track 126 and 127 is supported a knife 141 on a spring arm 142 attached to one of the links or braces 125 by which the tracks are supported. Each knife is mounted so as to lie at such an angle and at such a position that as each carrier 85 advances toward the same, the knife will enter between the body of the carrier and the door 115 of the lower side and being steadied by the edges of the carrier sides 112, snip or cut off the ends of the beans as the carrier passes. After passing the first knife, the carriers are straightened and then tilted in the opposite direction to have the other ends of the beans snipped or cut off by the second knife 141, after which they are emptied into a suitable receptacle or upon a conveyer and removed.

Before reaching the knife each carrier as it passes below the hopper 84, strikes the finger 105 on the bottom thereof to open said bottom and empty a measure of beans into the carrier. Proceeding thence a little farther, the fingers 118 on the carrier engage a closing frame 143 extending downwardly from the bars 124 of the shaking frame and are folded over and upon the contents of the carrier. While thus folded, the action of the knife begins on the ends of the beans, but before the snipping operation is completed, the fingers 118 will be out of engagement with the frame 143; therefore to maintain the fingers and plate against the contents of the hopper to hold them against movement, the U-shaped frame 119 strikes an arm 144 also attached to the shaker frame that holds the fingers and plate 117 on the beans until the carrier has passed beyond the action of the knife. The frame 119 then escaping from the arm 144 is swung upwardly by its spring 120 into the position shown in Fig. 11. This operation is repeated on approaching the other knife.

Attached to each link 125 on which a knife 141 is mounted, is an arm 145 that projects inwardly from the link and has secured thereon, a cam 146 such cam being situated below the knife 141. As the carriers 85 in their travel are engaged successively by the knives 141 to cut off the ends of the beans contained therein, the arm 116 projecting downwardly from the bottom of the swinging end 115 of the carrier, encounters the cam 146, and because of its shape, the end 115 is swung open thereby permitting the severed ends of the beans to be discharged from the carrier 85. On the main driving shaft 106 is mounted a sprocket wheel 150 which by means of a sprocket chain 151 drives a second sprocket wheel 152 on a short shaft 153 carried in a bearing 154 secured above the frame 121 on the upper end of a vertical column 155. Affixed to the shaft 153 and driven thereby is a gear wheel 156 that engages a similar gear wheel 157 on the shaft 78 for the purpose of imparting motion to the chains 80 and the distributers 82 mounted thereon.

The operation of the machine is as follows: Beans of proper grade which pass through the chute $c$ are delivered upon the trough 87 of a snipping machine. This trough is supported in a downwardly inclined direction upon a resilient arm 88 and is subject to continuous shaking by tappets or cams 90 on the shaft 77 striking a finger 89 attached to the trough. This shaking causes the beans in the trough to assume a longitudinal position as they travel along the trough and to drop from the lower end thereof in regular order into the hopper 83.

At suitable intervals, traveling distributers 82 pass beneath the hopper 83 and, by the engagement of fingers 94 and 103, the bottom 91 of the hopper is opened and permits the beans therein to fall into the distributer. Before the bottom of the hopper is open, however, the gate 95 that closes the outlet of the trough 87 is lowered in order to prevent any beans from falling into the hopper 83, while the bottom thereof is opened. After receiving the beans from the hopper 83, the traveling distributer 82 continues toward the hopper 84, releasing the bottom which immediately closes and the gate 95 permitted to rise, the beans once more continuing to feed into the hopper 83. Each traveling distributer 82 when it reaches the hopper 84 has its bottom 99 opened by means of a finger 104 on the hopper 84 engaging the depending finger 102 on said bottom. The contents of the distributer 82 immediately fall into the hopper 84 where they remain until a carrier 85, attached to the endless chains 110, is brought beneath the hopper, whereupon the carrier or a finger thereon engages the curved resilient finger 105 on the bottom of the hopper 84 and opens said hopper, dumping the contained beans into the carrier 85. In this position of the carrier, the resilient pressing fingers 118 stand in raised position as shown in Fig. 11 so that the beans may enter the carrier freely and without interruption.

After passing under the hopper 84, the carriers 85 in succession enter between the tracks 126, 127, the pins or studs 135, 136 on the ends of the carriers enter the mouths at 39 of the two guiding tracks, and as these tracks are supported by the links 125 that depend from and form a part of the shaking frame 121, the carriers will in turn be given a greater or less vertical movement that depends upon the position of the tappets 132 with relation to the frame 121. Continued movement in a forward direction of the carriers 85, will cause the pins 135—136 riding in the tracks 126—127 to tilt the carrier upwardly at one end and downwardly at the other, thus forcing the beans to gravitate toward and against the lower end 115. While in this position, the carriers 85 pass the knife 141 that enters between the body of the carrier and the movable lower end 115 thereof, engage the beans and cut the ends therefrom which immediately fall from the machine as the lower end 115 is swung open by the finger 116 on said end engaging the cam 146.

Each carrier 85 after passing the first knife 141 is straightened and immediately inclined in the opposite direction and, passing the second knife, the other ends of the beans are severed and permitted to fall. The beans themselves are now ready to be discharged for canning purposes. The advance of the carriers through the frame 121, is attended by a thorough shaking which helps to maintain the beans in alinement and to work them toward the lower end of the carriers. Just before the carriers reach the first knife, the fingers 118 engage the frame 143 which causes said fingers and the plate 117 to which they are attached, to swing into the carrier and press upon the beans therein, holding them firmly during the cutting process. To further maintain the fingers upon the beans after passing the frame 143, is the province of the U-shaped frame 119 which engages the finger 144 and holds said fingers 118 upon the beans until after the cutting operation is completed, whereupon the frame 119 being released, the spring 120 immediately lifts the plate 117 and the attached fingers 118 from the beans and they swing to their normal position shown in Fig. 11.

What I claim is:

1. An apparatus for snipping or cutting off the ends of string beans and the like comprising a plurality of carriers for the beans movable in an endless path, means extending on each side of said path for a limited distance and operating on said carriers to tilt them first to one side and then the other to cause the beans therein to gravitate to the lower side, shaking means supporting said tilting means to shake the carriers while being tilted, a cutting mechanism on each side of the path in position to successively enter the depressed sides of the carriers and sever the ends from the beans, and means for swinging open said lower carrier side to discharge the tips cut from the beans.

2. An apparatus for snipping or cutting off the ends of string beans and the like comprising a plurality of carriers for said beans supported by parallel endless belts, a vertically reciprocable frame spanning said carriers, a track on each side of the path of the carriers supported in said frame and operating on said carriers to shake them and tilt them first to one side and then to the other to cause the beans therein to gravitate to the lower side, a cutting mechanism on each side of the path of motion of said carriers and supported on said vertically reciprocating frame in position to successively enter the depressed sides of the carriers and sever the ends from the beans, and means for swinging open said lower carrier side to discharge the tips cut from the bean.

3. An apparatus for snipping or cutting off the ends of string beans and the like comprising a plurality of carriers for said beans movable in an endless path, a feed hopper, a movable receptacle having a hinged bottom for delivering measured quantities of string beans from said hopper to said carriers, means for opening the bottom of said receptacle to release the beans therein, a track on each side of the path of movement of the carriers, means projecting from the sides of the carriers for engagement with said tracks for guiding the same and causing the carriers to tilt first to one side and then to the other to force the beans contained therein to gravitate to the lower side, shaking means supporting said tilting means to shake the carriers while being tilted, a knife on each side of the path of movement in position to successively enter the depressed sides of the carriers and sever the ends from the beans, and means for swinging open the said lower carrier sides to discharge the tips cut from the beans.

4. An apparatus for snipping or cutting the ends of string beans and the like, comprising a receiving and a discharging hopper, distributing means for conveying measured quantities of beans from one to the other hopper, traveling carriers adapted to receive the beans from the disbursing hopper and convey the same to cutting means, means for successively elevating the ends of each traveling carrier to cause the beans therein to gravitate toward the opposite ends, cutting mechanism for snipping the ends of the beans in the carriers, and means for shaking the carriers to aline the beans therein.

5. An apparatus for snipping or cutting the ends of string beans and the like comprising a receiving and a disbursing hopper, distributing means traveling continuously between said hoppers for conveying measured quantities of beans from one to the other, a plurality of traveling carriers adapted to receive the beans from the disbursing hopper and to convey the same to cutting means, a track on each side of the path of travel of said carriers having elevated and depressed portions therein, connections between said carriers and said track for successively elevating the ends of each carrier to cause the beans therein to gravitate toward the opposite end, cutting mechanism for cutting the ends of the beans as they lie in the carriers, and means for shaking the carriers to aline the beans therein.

6. An apparatus for snipping or cutting the ends of string beans and the like comprising a supporting frame, a guiding track on each side thereof, a plurality of traveling carriers passing between and guided by said tracks whereby loaded carriers will have their ends successively elevated, a plurality of disbursing buckets for delivering measured quantities of beans to each carrier, cutting means for snipping the ends of the beans as they pass along the guide means, and a vibratory feed trough through which the beans are delivered to the distributing bucket.

7. An apparatus for snipping beans and the like comprising a supporting frame, a guiding track on each side thereof, each track having alternately raised and depressed portions, a plurality of traveling bean carriers passing between said tracks, a plurality of distributer buckets for delivering a measured quantity of beans to each carrier, buckets on said carrier engaging said tracks and to positively tilt the carriers to opposite sides as they advance and cause the beans to alternately gravitate to the lower sides thereof, a cutting mechanism for coöperating with the lower side of the carrier to snip or cut the ends from the beans, and a vibratory feed trough through which the beans are delivered to the distributer bucket.

8. An apparatus for snipping beans and the like comprising a frame and a plurality of traveling carriers movable therein in an endless path, a feeding hopper, a delivering hopper having a movable bottom, a traveling receptacle with a hinged bottom for delivering measured quantities of beans to be snipped from the feeding hopper to the delivery hopper, means on said delivery hopper to open the bottom of said receptacle, means on each of said carriers for opening the bottom of the delivery hopper, means for shaking the carriers while loading, means for tilting the carriers first in one direction and then in the other as they are advanced to cause the alined beans therein to gravitate to the lower ends, means for holding the beans immovable in the carrier while the latter is tilted, and cutting means adapted to enter the lowered end of the carrier and snip the ends of the beans therein.

9. An apparatus for snipping beans and the like comprising a vibratory feed trough, a receiving hopper below the same, a plurality of traveling carriers movable in an endwise path, a disbursing hopper above the carriers and adapted to discharge thereinto, a plurality of delivering means adapted to transport the material to be snipped from the receiving hopper to the disbursing hopper, guide means for tilting the lowered carriers to cause the material therein to gravitate to the lower end, and a cutting means adapted to enter the lower end of the carrier and snip the ends of the beans therein.

10. An apparatus for snipping beans and the like comprising a rigid frame, a plurality of traveling carriers movable therein in an endless path, means for feeding measured quantities of beans to each of said carriers, means for imparting vibratory movement to the carriers while loaded, means for tilting said carriers first to one side and then to the other to cause the beans therein to gravitate toward the lower end, means for pressing upon and holding the beans in the carrier after being tilted, and a cutter adapted to enter the lower end of the hopper and sever the ends from the beans.

11. An apparatus for snipping beans and the like comprising a plurality of carriers movable in an endless path, a pair of fixed hoppers, distributing means for conveying the material from one hopper and delivering it into the other, means projecting from each of said traveling carriers for opening the bottom of the second of said hoppers and causing the discharge of the contents into the carrier passing therebeneath, means for successively raising the ends of each carrier, and a cutting means for entering the lower end of either carrier and snipping the ends from the beans therein.

In testimony whereof I affix my signature in presence of two witnesses.

JOSEPH KING.

Witnesses:
MARGUERITE H. STONE,
F. HOYT HOLLISTER.